US009223492B2

(12) United States Patent
Kim

(10) Patent No.: US 9,223,492 B2
(45) Date of Patent: *Dec. 29, 2015

(54) TEAR-AWAY TOPOLOGY VIEWS

(71) Applicant: International Business Machines Corporation, Armonk, NY (US)

(72) Inventor: Steven P. Kim, Raleigh, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 225 days.

This patent is subject to a terminal disclaimer.

(21) Appl. No.: 14/033,526

(22) Filed: Sep. 23, 2013

(65) Prior Publication Data

US 2014/0026059 A1 Jan. 23, 2014

Related U.S. Application Data

(63) Continuation of application No. 10/909,712, filed on Aug. 2, 2004, now Pat. No. 8,627,234.

(51) Int. Cl.
*G06F 3/0486* (2013.01)
*G06F 3/0482* (2013.01)

(52) U.S. Cl.
CPC ............ *G06F 3/0486* (2013.01); *G06F 3/0482* (2013.01)

(58) Field of Classification Search
CPC ... H04L 41/12; H04L 43/045; Y10S 715/969; G06F 3/0482; G06F 3/0486; G06F 17/30126; G06F 17/30554; G06F 17/30994
USPC ................ 715/734, 769, 770, 853, 854, 969; 709/224
See application file for complete search history.

(56) References Cited

U.S. PATENT DOCUMENTS

| | | | |
|---|---|---|---|
| 5,598,524 A | 1/1997 | Johnston, Jr. et al. | |
| 5,701,137 A | 12/1997 | Kiernan et al. | |
| 5,768,552 A | 6/1998 | Jacoby | |
| 5,870,559 A | 2/1999 | Leshem et al. | |
| 5,910,803 A | 6/1999 | Grau et al. | |
| 6,040,834 A | 3/2000 | Jain et al. | |
| 6,054,987 A | 4/2000 | Richardson | |
| 6,404,446 B1* | 6/2002 | Bates et al. | 715/854 |
| 6,456,306 B1 | 9/2002 | Chin et al. | |
| 7,315,985 B1 | 1/2008 | Gauvin et al. | |
| 7,631,255 B2* | 12/2009 | Weise et al. | 715/229 |

(Continued)

OTHER PUBLICATIONS

Steven P. Kim, U.S. Appl. No. 10/909,712, filed Aug. 2, 2004, Office Action, Sep. 14, 2007, 16 pages.

(Continued)

*Primary Examiner* — Andrew Tank
(74) *Attorney, Agent, or Firm* — Marcia L. Doubet

(57) ABSTRACT

Enabling users to select a subset of elements represented by a rendered topology view, and in response, a new view comprising the selected elements is automatically created. Preferred embodiments render this subset view, referred to herein as a "tear-away view", alongside the topology view from which the elements were selected, thereby enabling the user to focus on the selected elements in context of the bigger picture. An active correlation is preferably maintained between the views, such that various updates to one view are also reflected in the other view. Preferred embodiments automatically create a new data model underlying the tear-away view, and in one aspect, this data model and/or tear-away view may be persisted.

20 Claims, 6 Drawing Sheets

(56) References Cited

U.S. PATENT DOCUMENTS

| | | |
|---|---|---|
| 2002/0165934 A1 | 11/2002 | Conrad et al. |
| 2003/0020764 A1 | 1/2003 | Germain et al. |
| 2003/0067481 A1 | 4/2003 | Chedgey et al. |
| 2003/0184599 A1 | 10/2003 | Beaudoin |
| 2004/0073659 A1 | 4/2004 | Rajsic et al. |
| 2005/0007383 A1 | 1/2005 | Potter et al. |
| 2005/0246283 A1 | 11/2005 | Gwiazda et al. |
| 2006/0048075 A1 | 3/2006 | Kim |
| 2008/0294641 A1* | 11/2008 | Kim .................................. 707/9 |

OTHER PUBLICATIONS

Steven P. Kim, U.S. Appl. No. 10/909,712, filed Aug. 2, 2004, Office Action, Feb. 15, 2008, 19 pages.

Steven P. Kim, U.S. Appl. No. 10/909,712, filed Aug. 2, 2004, Office Action, Jul. 17, 2008, 12 pages.

Steven P. Kim, U.S. Appl. No. 10/909,712, filed Aug. 2, 2004, Office Action, Dec. 24, 2008, 14 pages.

V. Fayet, et al., "Hop-by-Hop Routing with Node-Dependent Topology Information", IEEE INFOCOM '99 Conference of Computer Communications Proceedings Eighteenth Annual Joint Conference of the IEEE Computer and Communications Societies, The Future is Now, vol. 1, pp. 79-87.

"Technique for Implementing Connected Topologies within an IBM LAN Netview Start Network", TDB v37 n2B 02-94, pp. 545-546.

"Drill Down Regrouping Design for the Massive Node Server Status Monitor", TDB n4B 09-92, pp. 145-147.

"Application Sample", ILOG. Internet-published article (1987-2004), printed Jul. 21, 2004, <http://www.ilog.com/products/jviews/success/application_sample.cfm>, 2 pages.

"Demos", ILOG. Internet-published article (1987-2004), printed Jul. 21, 2004, <http://www.ilog.com/products/jviews/demos/index.cfm>, 5 pages.

"ILOG JViews DHTML Thin Client Global Internet Map", ILOG. Internet-published article (1987-2004), printed Jul. 21, 2004, <http://www.ilog.com/backbones/dhtml/help.html>, 3 pages.

"Network node manager advanced edition 7.01 overview & features", Hewlett-Packard Open View. Internet-published article (1994-2004), printed Jul. 21, 2004, <http://www.openview.hp.com/products/nnm/index.html>, 2 pages.

* cited by examiner

US 9,223,492 B2

TEAR-AWAY TOPOLOGY VIEWS

BACKGROUND OF THE INVENTION

1. Field of the Invention

The present invention relates to computer software, and deals more particularly with enabling users to focus on a selectable subset of elements represented by a rendered topology view.

2. Description of the Related Art

The term "topology" is commonly used to refer to an arrangement of nodes in a computing system, as well as relationships among those nodes. A "topology view" is used to view this arrangement of nodes and to display their inter-relationships. Users typically have the ability to interact with this view to select nodes and/or links representing the inter-relationships, and to query information on a selected element (i.e., node or link). Since a topology view offers a "top-down" view of a system, users also typically have the capability to "drill down" from one level to another (e.g., to obtain more detailed information).

The present invention addresses limitations of existing topology views.

SUMMARY OF THE INVENTION

The present invention provides techniques for enabling users to select a subset of elements represented by a rendered topology view, and in response, a new view comprising the selected elements is automatically created. Preferred embodiments render this subset view, referred to herein as a "tear-away view", alongside the topology view from which the elements were selected, thereby enabling the user to focus on the selected elements in context of the bigger picture. An active correlation is preferably maintained between the views, such that various updates to one view are also reflected in the other view. Preferred embodiments automatically create a new data model underlying the tear-away view, and in one aspect, this data model and/or tear-away view may be persisted.

The present invention will now be described with reference to the following drawings, in which like reference numbers denote the same element throughout.

DESCRIPTION OF PREFERRED EMBODIMENTS

The present invention provides techniques that enable users to build what are referred to herein as "tear-away" topology views and to interact with those views. A tear-away topology view comprises a subset of elements from a main topology view. Preferred embodiments enable each individual user (such as a systems administrator) to select which elements from the main topology view should be included in that user's tear-away view or views. Preferably, these tear-away views are interactive views where actions performed on a tear-away view can be correlated to the main topology view; various actions performed on the main topology view may also be reflected on corresponding elements of the tear-away topology view. In one aspect, the tear-away topologies may be persisted or exported.

Drawbacks of prior art topology views will now be described.

Figure 1:
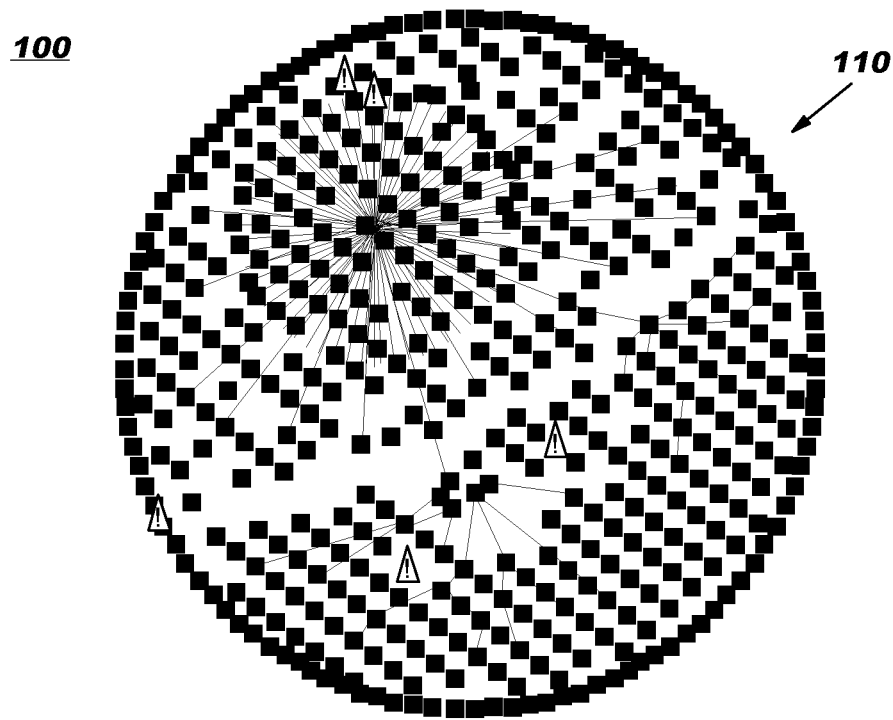
FIG. 1 illustrates a sample topology view of the prior art.
Figure 1:
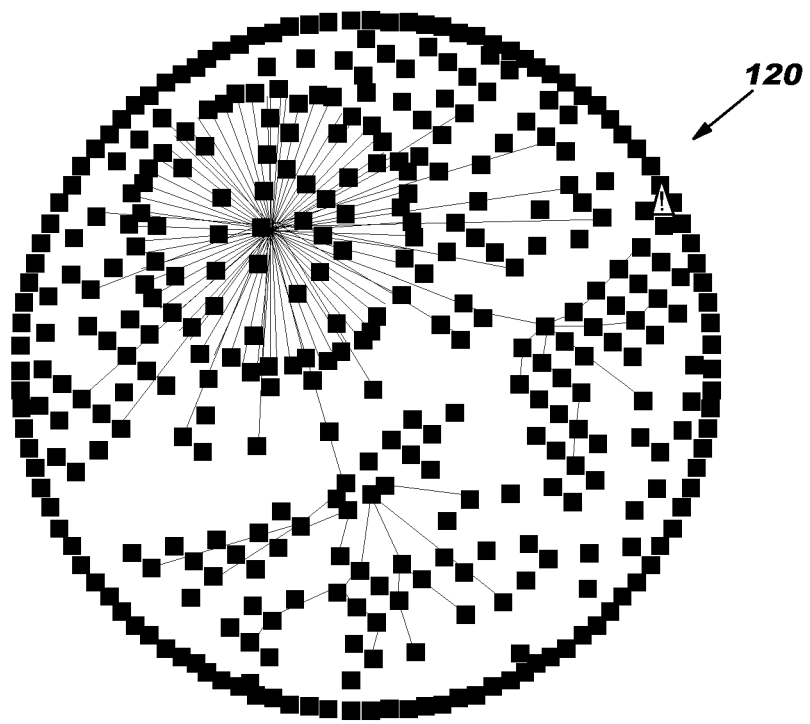

FIG. 1 illustrates a sample topology view 100 of the prior art. As can be seen by inspection, this view 100 represents a large number of nodes and relationships. In the figures herein, nodes are depicted as square icons and relationships are shown as lines or links between those icons (although this is by way of illustration and not of limitation).

When the number of nodes and links displayed within a topology view exceeds a relatively small number, a user's ability to discern useful information from the view is reduced. In fact, the number of nodes and links in a topology view may become overwhelming. This is illustrated by the sample view 100 in FIG. 1, where nodes and links for two networks 110, 120 are depicted; in actual practice, a topology view of this type might contain even more nodes and links.

Figure 2:
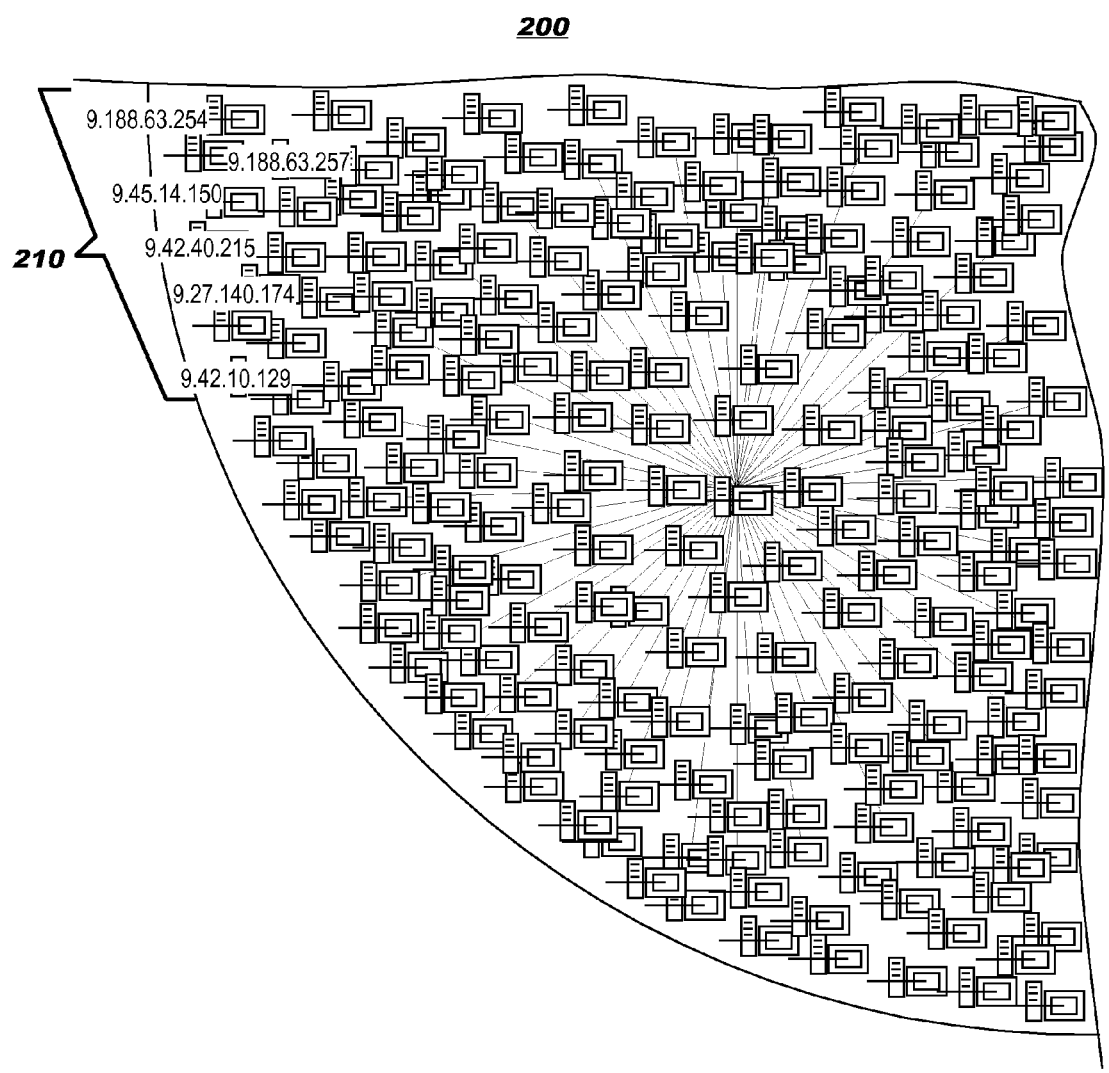
FIG. 2 illustrates a sample zoomed-in view of a portion of a topology, according to the prior art.

FIG. 2 illustrates a sample "zoomed-in" or "zoomed" view 200 of a topology according to the prior art. (The view 100 in FIG. 1 may be referred to as a "zoomed-out" view, by contrast.) A topology view may allow the user to zoom in to better focus his or her attention on a subset of the overall topology. In this representative zoomed-in view 200, the nodes are no longer shown as square icons. Instead, this sample zoomed-in view 200 provides computer-styled icons to represent nodes. Reference number 210 generally indicates sample network addresses which are rendered for several of the nodes. In actual practice, network addresses (or other node-specific characteristics) are often depicted alongside every one of the nodes in a zoomed-in view of this type. However, for ease of illustration, network addresses have been omitted from FIG. 2 for the remaining nodes in the sample view 200.

As illustrated by the sample view in FIG. 1 and the sample zoomed view in FIG. 2 (and in particular, the portion thereof where sample network addresses have been provided), the user's ability to view a distinct set of nodes or to work with a distinct set of nodes (e.g., by clicking on the node's icon or its links, thereby requesting more information) may become futile as the system grows beyond a relatively small size. To deal with this situation using prior art techniques, the user may be forced to hide a series of nodes within a view—for example, by individually identifying nodes to be suppressed from the view or by use of a software filter that omits node representations based on characteristics specified for the filter. Or, the user may try to isolate the nodes of interest by zooming in to a sufficiently-small section of the view, and then trying to ignore all other extraneous data. These approaches have a number of drawbacks, including an inability to maintain an overall "big picture" perspective, decreased user productivity, user confusion, and resulting error-prone operation.

No techniques are known to the present inventor that enable "breaking down" a topology view into smaller views (referred to equivalently herein as tear-away views or "sub-topology views"), where those smaller views present a user-selectable subset of the overall topology view—while, at the same time, allowing that user to continue viewing the entire "big picture".

Furthermore, although prior art topology views support navigation among levels (as in the drill-down approach mentioned earlier), no techniques are known to the present inventor to build or tear away a subset of the topology view that displays data of interest to this user, as determined by this user.

Preferred embodiments address these and other limitations of prior art topology views through user-selectable tear-away topology views. Using a preferred embodiment of the present invention, a user can select one or more elements rendered in a main topology view and then drag and drop the selected elements outside the main topology view, resulting in creation of a separate tear-away topology view. Individual users can therefore select elements within a topology view that are specific to their needs and view that selected subset, while at the same time viewing the overall topology of the entire system. Preferred embodiments also maintain active correlations, or communications, between nodes and links of the tear-away views and their counterparts in the main topology view (as discussed in more detail below). In addition, in an optional aspect, embodiments of the present invention enable users to export tear-away views and persist those as separate topology views, effectively allowing them to create their own user-specific, reusable sub-topology views of the system.

Figure 3A:
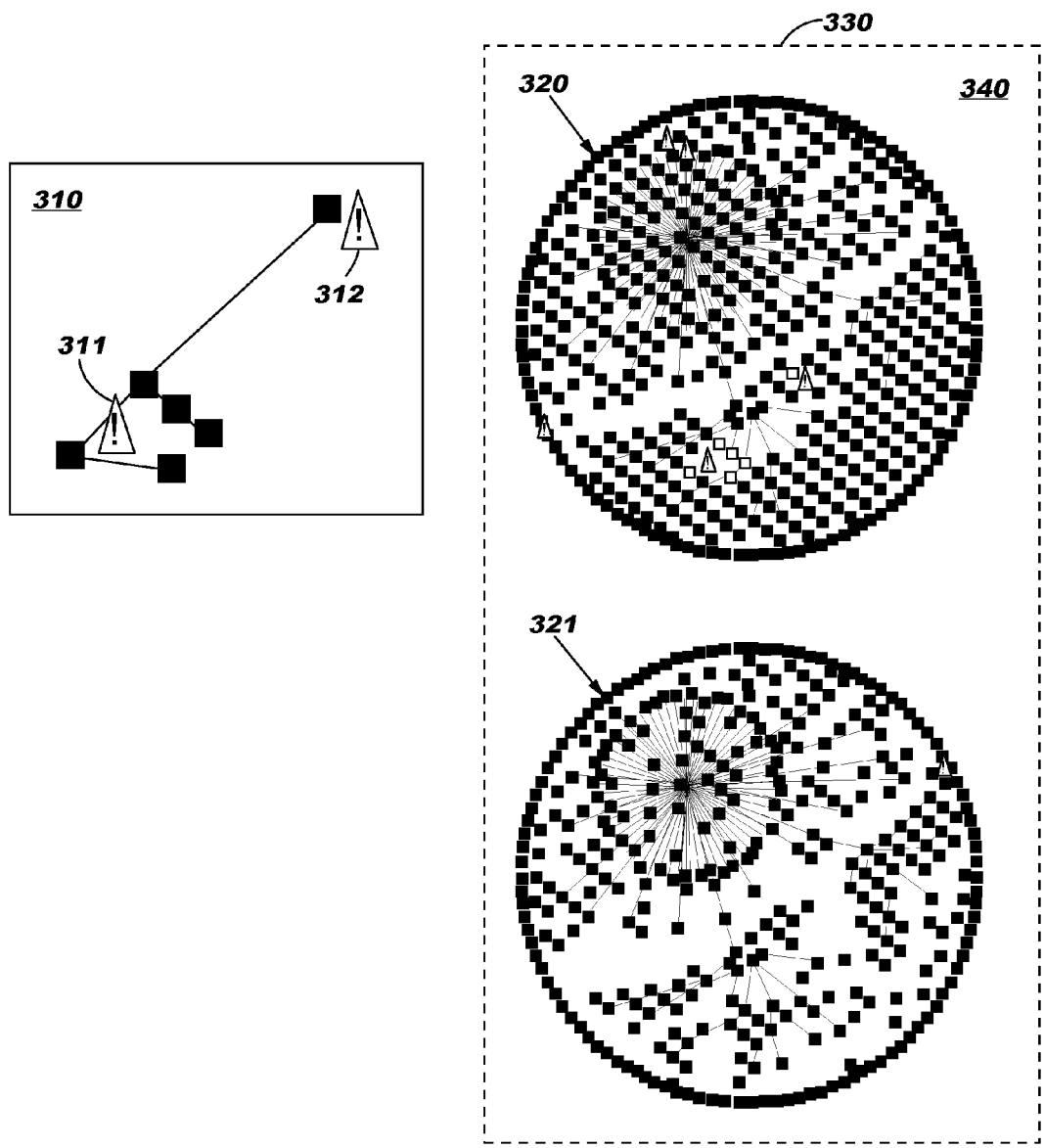
FIG. 3A provides an example of a torn-away topology view created from a larger topology view, according to preferred embodiments of the present invention, and FIG. 3B emphasizes a portion of detail from FIG. 3A.

Referring now to FIG. 3A, an example is provided of a sample tear-away topology view that might be created by a user of an embodiment of the present invention. One manner in which a user may create this tear-away topology view will now be described. A boundary 330 is visually depicted in FIG. 3A as a dashed rectangle (by way of example only) that surrounds a topology view 340 (comprising, in this example, a view of a first network 320 and a second network 321). From this rendered topology view, a user selects one or more nodes and/or links—for example, by positioning a pointing cursor over the rendering thereof and then depressing a selection mechanism such as the left mouse button. Then, the user continues to depress the selection mechanism while dragging the pointing cursor (or similar indicator) to a point outside the boundary area of the main topology view. The user then releases the pointing cursor, and in response, a new tear-away view (see reference number 310) is created, containing the selected nodes and/or links. Preferably, this tear-away view is rendered within the same view or window as the main topology view, as illustrated in FIG. 3A by reference numbers 310, 340.

In one approach, an implementation of the present invention allows the user to select nodes and links separately. In an alternative approach, selection of nodes may be used as a signal to automatically select links that reach those nodes. In yet another alternative approach, selection of nodes may signal that links should be automatically selected only if they connect selected nodes. An implementation of the present invention may support one or more of these approaches (and optionally, users may be allowed to selectively choose among the approaches when more than one is available, for example by setting a configuration option or by activating a dynamic selection means on a graphical display).

Figure 3B:
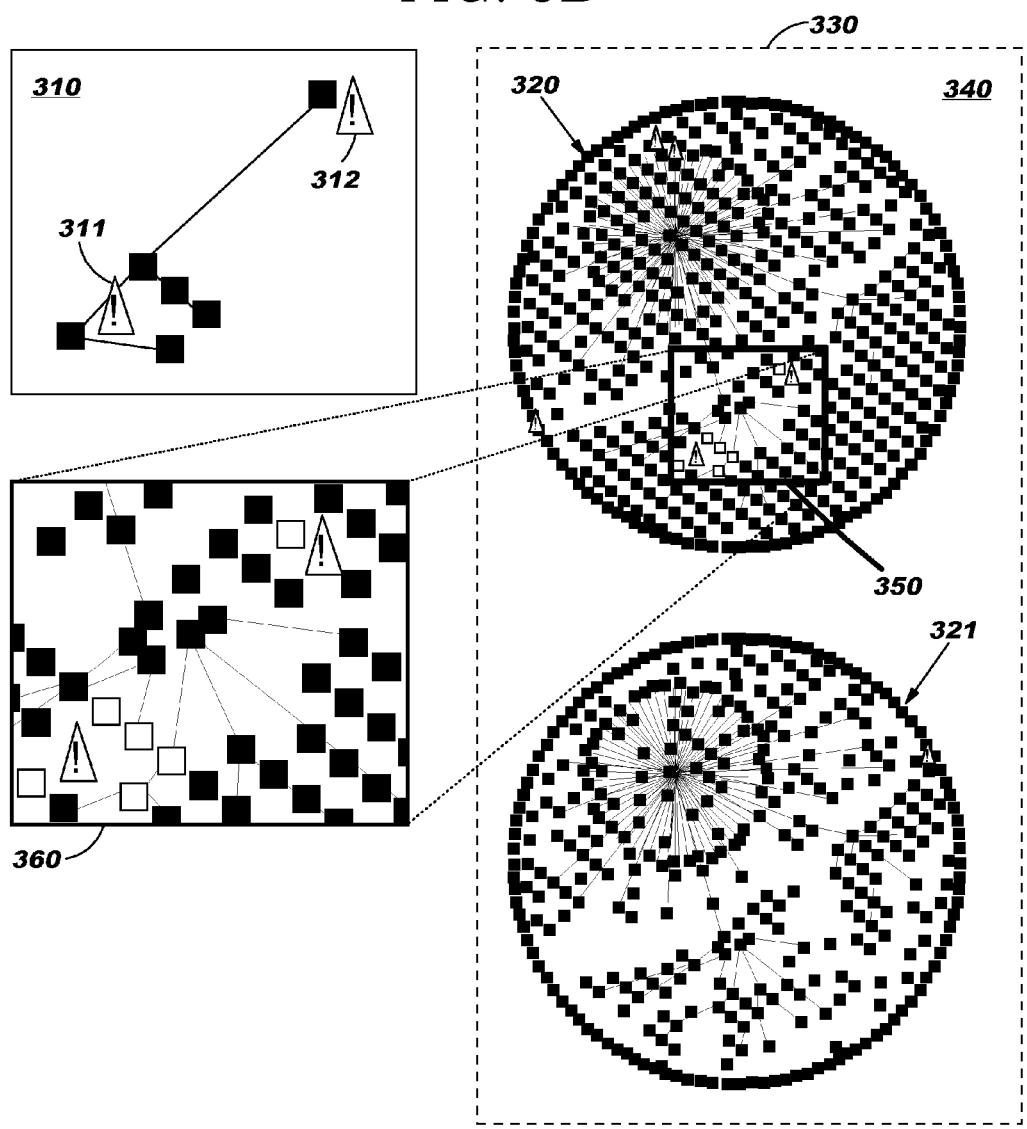

In the example of FIG. 3A, the tear-away topology view 310 shows that the user has selected a relatively small subset of the nodes/links from main topology view 340. In practice, the interests of the particular user will determine how many nodes/links, and which ones, are selected. As one example, the user might select nodes surrounding a node or link that has been visually distinguished in the main topology view as experiencing performance problems. Note that the sample tear-away topology view 310 includes two "caution" or "warning" symbols 311, 312. While it is difficult to view warning symbols or other problem indicators in the crowded topology view 340 of FIG. 3A, FIG. 3B provides an "exploded" view 360 of a portion of detail from FIG. 3A, where that portion has been surrounded by a rectangle 350. As can be seen in exploded view 360, two warning indicators are present in this portion of the main topology view. The user has therefore selected a subset of the surrounding elements for rendering in tear-away topology view 310, allowing the user to focus on those selected elements.

Note that FIGS. 3A and 3B also illustrate an optional enhancement, whereby the rendering within main topology view 340 of the nodes that have been selected and used for creating the tear-away topology view 310 is visually distinct from the non-selected nodes. This can best be seen in the exploded portion 360, where the 6 selected nodes are depicted as hollow icons instead of the solid icons used for the remainder of the nodes. (See also FIG. 1, where these same nodes 6 nodes have not yet been selected in the main topology view 100 and have therefore not been visually distinguished.)

Preferred embodiments maintain active correlations between the tear-away topology view and the main topology view, as noted earlier. For example, selecting an element in a tear-away view preferably causes a corresponding selection of that item within the main topology view (thereby allowing the user to see how the views are related). Similarly, various actions performed against an element in one of the topology views may be reflected in the rendering of the corresponding element in the other topology view. For example, if the user selects a link in the tear-away view and requests that the link be disabled, or selects a particular device and then requests stopping or starting that device, the rendering of that link or device may change in the tear-away topology view. Thus, the main topology view is preferably revised, as necessary, such that it remains aligned with that element's rendering in the tear-away view. As another example, if the user rearranges nodes in the tear-away topology view, the corresponding depictions in the main topology view are preferably rearranged in an analogous manner. As yet another example, communication between the views may be triggered responsive to events that impact a view. Suppose a node in a network fails, thereby causing its visual representation in the main topology view to be changed to a red icon. If the failing node is also present in a tear-away topology view, this node-failure information may be communicated to the tear-away topology view, causing the node to also be visually flagged in that view.

The correlation between views may be disabled, at least for some actions, thereby enabling various actions that are performed against a view to be applied independently to one view or the other (and the disabling may optionally be user-selectable). As an example, the user may select to filter the tear-away view to show only nodes with a particular status, such as having an icon color of yellow (which may indicate a warning or caution status), without affecting the main topology view. In this manner, the user can view a subset of the data according to specific criteria while, at the same time, actively monitoring the larger main topology view. As another example, the user might select to temporarily disable the correlation to manipulate selected ones of the nodes in the tear-away topology view, and then restore the correlation to allow the result to be reflected in the main topology view. Provision may be made for disabling the correlation as to all elements of the tear-away topology view, or alternatively, for selected ones of those elements.

In another aspect, creating a tear-away topology preferably automatically generates a corresponding data model that contains the selected nodes/links. This data model remembers which elements are to be included, along with the interrelationships. The model also preferably remembers the visual alignment of those elements, such that the same alignment will be used when the tear-away topology is reused (e.g., if the user requests to re-display a previously-defined tear-away topology view). The model preferably associates a user-selected name or identifier with the particular tear-away topology view. (This data model is also preferably used when correlating actions between the tear-away topology view and the main topology view.)

In an optional aspect, the data model can be leveraged to enable users to export or persist the tear-away topology view(s) they have created. Users may build one or more tear-away topology views, based on their business needs or other criteria, in order to establish views for specific functions. An example is provided in FIG. 4, where the user has selected a subset of the elements from main topology view 420 for rendering in tear-away topology view 410. In this example, the user has further zoomed in on the tear-away topology view, enabling certain details of each node to be rendered. Note that in this example, the zooming action on view 410 is not correlated to view 420, and view 420 therefore remains in its original non-zoomed state. Suppose the elements in this sample tear-away topology view 410 are nodes that are used when performing a nightly build operation. The systems administrator may therefore wish to view operations of those nodes each night. By persisting the tear-away topology view 410, the administrator can quickly and efficiently request the detailed and focused view of the nodes of interest, without having to search for and select those nodes from the main topology view each night.

In the prior art, creation of a new topology view typically involves accessing a database (or a plurality of databases) to obtain information to be used in the rendering. Execution of complex algorithms may also be required to build the topology view. By contrast, embodiments of the present invention provide for rapid development of new views, as has been demonstrated with reference to the sample tear-away topology views in FIGS. 3A and 4.

In addition, embodiments of the present invention may optionally allow a user to reuse persisted tear-away topology views as a basis for defining new tear-away topology views. For example, suppose the user has persisted the tear-away topology view shown at 410 in FIG. 4, and now wishes to view and interact with some subset of those elements. The view 410 may be rendered, and the user may then remove selected ones of the elements from that view, creating a new data model (preferably with a new identifier).

In the prior art, it is common for access permissions to be set on a per-resource basis. For example, access to information about individual nodes or links may be restricted to designated users or user groups. When a user wishes to interact with resources from a topology view of the type depicted in FIG. 1, this type of one-at-a-time access control can be problematic. Embodiments of the present invention may be used to provide more efficient, easier-to-use access controls. Upon defining the collection of resources for a particular tear-away topology view, access control information may be established in terms of that view (and the data model associated with the tear-away topology view may be augmented with access-control information), thereby enabling a user to access the entire collection of resources with one access verification.

Figure 5:
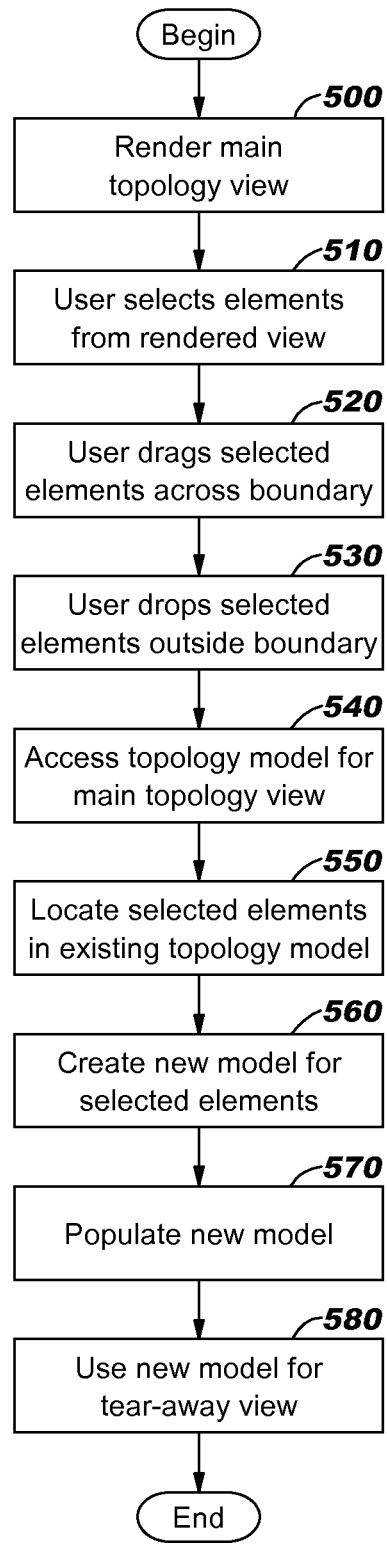
FIG. 5 depicts a flowchart illustrating logic that may be used when implementing preferred embodiments of the present invention.

Referring now to FIG. 5, a flowchart is depicted which illustrates logic that may be used when implementing preferred embodiments of the present invention, as will now be described. Beginning at Block 500, a main topology view is rendered, preferably using prior art techniques. (As an example, a prior art product known as "ILOG® Jviews" provides a graphics toolkit having components with which various types of graphs and charts, including topology charts, can be created. "ILOG" is a registered trademark of ILOG Corporation France, and information about Jviews may be found on the corporate Web site.)

Figure 4:
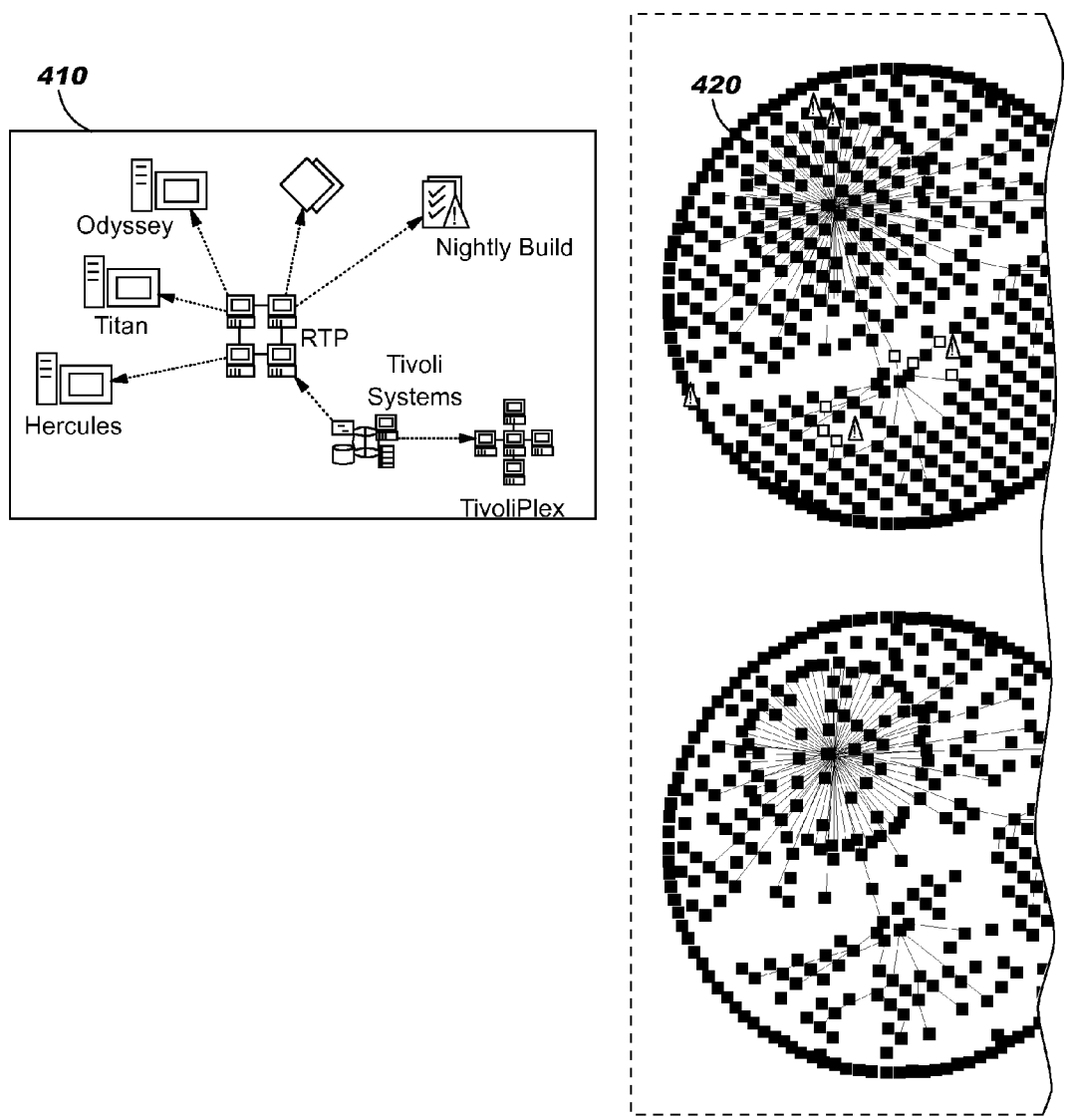
FIG. 4 provides another example of a torn-away topology view, according to preferred embodiments of the present invention, and illustrates using zoom to view additional details.

From this rendered topology view, the user selects one or more elements (Block 510). Preferably, prior art selection techniques are leveraged, including the ability to select multiple elements (e.g., by depressing the "Control" or "Shift" key on a keyboard and then depressing the left mouse button over icons associated with each element of interest). Once the elements of interest have been selected, the user drags those elements across a boundary (Block 520). A visual boundary is illustrated in FIGS. 3A, 3B, and 4, as a dashed rectangle. Other approaches to defining a boundary may be used without deviating from the scope of the present invention. As one example, an invisible boundary may be used, and audio means may be activated to signal the user that the boundary has been crossed. As another example, the boundary may be defined as the outermost perimeter of elements in the rendered topology view, such that dragging elements beyond this perimeter indicates that the boundary has been crossed.

When the user drops the selected elements outside the boundary (Block 530), preferred embodiments interpret this as an indication that a tear-away topology view is to be created using those elements. Block 540 therefore accesses the topology model of the main topology view, and this topology model is searched (Block 550) for each of the selected elements. Upon locating the model information for each element, a new model is created (Block 560) and populated (Block 570) using that information. As indicated in Block 580, this new model is then used for the tear-away view.

It should be noted that techniques other than drag-and-drop may be used for positioning the selected elements outside the main topology view, thereby indicating that a tear-away topology is to be created, without deviating from the scope of the present invention. As one example, the user may touch a light pen to a rendering to indicate a group of elements, and may then activate a graphical user interface control, such as a graphical button, which is operably associated with a "create new tear-away topology" function.

A user may optionally create more than one tear-away view from a particular main topology view. Embodiments of the present invention may choose to render these multiple tear-away views separately (using, for example, views as shown in FIGS. 3A and 4 to render two different tear-away topology views). Or, alternatively, multiple tear-away topology views may be rendered within a single overall view, using (for example) a tiled or cascaded approach.

Preferred embodiments have been illustrated herein with reference to topology views depicting components of a computing network. This is by way of illustration and not of limitation. Embodiments of the present invention may be used advantageously in other scenarios, including (but not limited to) a topology view of internal components of a device or elements comprising other complex systems.

As has been demonstrated, the present invention provides advantageous techniques that address a number of drawbacks of the prior art. Benefits include (but are not limited to) users' ability to focus on specific elements or areas within a topology view; users' ability to create sub-topology views while, at the same time, maintaining a big-picture view of the overall topology; intuitive techniques such as drag-and-drop for creating tear-away views; and an ability to correlate actions between views.

As will be appreciated by one of skill in the art, embodiments of the present invention may be provided as methods, systems, or computer program products comprising computer-readable program code. Accordingly, the present invention may take the form of an entirely hardware embodiment, an entirely software embodiment, or an embodiment combining software and hardware aspects. The computer program products maybe embodied on one or more computer-usable storage media (including, but not limited to, disk storage, CD-ROM, optical storage, and so forth) having computer-readable program code embodied therein.

When implemented by computer-readable program code, the instructions contained therein may be provided to a processor of a general purpose computer, special purpose computer, embedded processor, or other programmable data processing apparatus to produce a machine, such that the instructions, which execute via the processor of the computer or other programmable data processing apparatus, create means for implementing preferred embodiments.

These computer-readable program code instructions may also be stored in a computer-readable memory that can direct a computer or other programmable data processing apparatus to function in a particular manner, such that the instructions stored in the computer-readable memory produce an article of manufacture including instruction means which implement preferred embodiments.

The computer-readable program code instructions may also be loaded onto a computer or other programmable data processing apparatus to cause a series of operational steps to be performed on the computer or other programmable apparatus to produce a computer-implemented method such that the instructions which execute on the computer or other programmable apparatus provide steps for implementing preferred embodiments.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A system, comprising:
    a computer comprising a processor; and
    instructions which are executable, using the processor, to implement functions comprising:
        rendering a first topology view comprising a plurality of elements, the view corresponding to an underlying first data model for the elements, the first data model including relationship information defining relationships among the elements;
        detecting a selection of a plurality of the rendered elements;
        detecting a dragging of the selected elements across a defined tear-away topology boundary, the tear-away topology boundary defined to signal that elements dragged across the boundary are to be used, when dropped, for creating a second topology view in association with the first topology view; and
        creating, responsive to detecting a drop of the dragged elements after detecting the signal that the elements were dragged across the defined tear-away topology boundary, the second topology view, the second topology view having a correlation with the first topology view, and a second data model that underlies the selected elements, wherein:
            the second topology view comprises a rendered copy of the selected elements, and the second data model comprises information that is copied, for each of the selected elements, from corresponding information in the first data model;
            the rendered copy maintains spatial positioning of, and relationships among, the selected elements as rendered in the first topology view; and
            provided that the correlation is active, an update to the rendered copy of the selected elements in the second topology view automatically causes a corresponding update to the selected elements in the first topology view, as well as corresponding updates to the second data model and the first data model, and an update to the selected elements in the first topology view automatically causes a corresponding update to the rendered copy of the selected elements in the second topology view, as well as corresponding updates to the first data model and the second data model.

2. The system according to claim 1, wherein the boundary surrounds the rendered first topology view.

3. The system according to claim 1, wherein the boundary is a visual boundary.

4. The system according to claim 1, wherein the boundary is an invisible boundary.

5. The system according to claim 4, wherein the functions further comprise sounding an audible indicator when the boundary is crossed.

6. The system according to claim 1, wherein the boundary is an outermost perimeter of the elements in the rendered first topology view.

7. The system according to claim 1, wherein the second topology view is rendered alongside the rendered first topology view.

8. The system according to claim 1, wherein the elements represent nodes of a computing network and links among the nodes.

9. The system according to claim 1, wherein the functions further comprise establishing access control rights to each individual one of the selected elements in the first topology view by establishing a single access control right to a collection that represents the selected elements in the second topology view.

10. The system according to claim 1, wherein the detecting the dragging is replaced by detecting a positioning of the selected elements outside the boundary, and wherein the creating then operates responsive to the detecting the positioning.

11. A computer program product, the computer program product comprising:
    a non-transitory computer-readable storage medium having computer readable program code embodied therein, the computer-readable program code configured for:
        rendering a first topology view comprising a plurality of elements;
        detecting a selection of a plurality of the rendered elements;
        detecting a dragging of the selected elements across a defined tear-away topology boundary, the tear-away topology boundary defined to signal that elements dragged across the boundary are to be used, when dropped, for creating a second topology view in association with the first topology view;
creating, responsive to detecting a drop of the dragged elements after detecting the signal that the elements were dragged across the defined tear-away topology boundary, the second topology view in association with the first topology view, wherein:
the second topology view comprises a copy of the selected elements;
the copy maintains spatial positioning of, and relationships among, the selected elements as rendered in the first topology view; and
providing a correlation between the selected elements in the first topology view and the copy of the selected elements in the second topology view, such that when the correlation is active, an update to the copy of the selected elements in the second topology view automatically causes a corresponding update to the selected elements in the first topology view and an update to the selected elements in the first topology view automatically causes a corresponding update to the copy of the selected elements in the second topology view;
rendering the second topology view; and
using the correlation to manage updating in the second topology view, comprising:
disabling the correlation prior to performing an update to the copy of the selected elements in the second rendered topology view;
restoring the correlation following the update; and
automatically revising the selected elements in the first rendered topology view, responsive to the restoring, such that the first rendered topology view also reflects the update.

12. The computer program product according to claim 11, further comprising persisting the second topology view.

13. The computer program product according to claim 12, further comprising:
detecting a subsequent rendering of the first topology view, responsive to a request for the subsequent rendering;
responsive to the request for the subsequent rendering, enabling the persisted second topology view to be rendered, from information stored by the persisting, in association with the subsequent rendering of the first topology view.

14. The computer program product according to claim 11, wherein the creating further comprises:
locating, in a topology data model corresponding to the first rendered topology view, information for each of the selected elements;
creating a new topology data model corresponding to the second rendered topology view;
populating the new topology data model with the located information; and
persisting the populated new topology data model.

15. The computer program product according to claim 11, further comprising using the method to create a third topology view from the second rendered topology view, wherein:
the third topology view comprises a copy of a subset of the selected elements;
the detecting a selection detects a selection of the subset, from the copy of the selected elements in the second rendered topology view;
the detecting a dragging detects a dragging of the subset across a second boundary, the second boundary defined to signal that subsets dragged across the second boundary are to be used, when dropped, for creating the third topology view in association with the second topology view;
the creating creates the third topology view in association with the second topology view, responsive to detecting a drop of the subset after detecting the signal of the dragging across the second boundary, the created third topology view maintaining the spatial positioning of, and relationships among, the subset as rendered in the second topology view and providing the correlation between the subset in the second topology view and the copy of the subset in the third topology view.

16. The computer program product according to claim 11, further comprising altering a visual representation of the selected elements within the first rendered topology view, responsive to the creating.

17. A computer program product, the computer program product comprising:
a non-transitory computer-readable storage medium having computer readable program code embodied therein, the computer-readable program code configured for:
rendering a first topology view comprising a plurality of elements;
detecting a selection of a plurality of the rendered elements;
detecting a dragging of the selected elements across a defined tear-away topology boundary, the tear-away topology boundary defined to signal that elements dragged across the boundary are to be used, when dropped, for creating a second topology view in association with the first topology view;
creating, responsive to detecting a drop of the dragged elements after detecting the signal that the elements were dragged across the defined tear-away topology boundary, the second topology view in association with the first topology view, wherein:
the second topology view comprises a copy of the selected elements;
the copy maintains spatial positioning of, and relationships among, the selected elements as rendered in the first topology view; and
providing a correlation between the selected elements in the first topology view and the copy of the selected elements in the second topology view, such that when the correlation is active, an update to the copy of the selected elements in the second topology view automatically causes a corresponding update to the selected elements in the first topology view and an update to the selected elements in the first topology view automatically causes a corresponding update to the copy of the selected elements in the second topology view;
rendering the second topology view; and
using the correlation to manage updating in the second topology view, comprising:
disabling the correlation for the copy of a particular one of the elements, prior to initiating an update affecting the particular element using the second rendered topology view;
restoring the correlation following the update; and
automatically revising a visual representation of the particular element in the first rendered topology view, responsive to the restoring, such that the first rendered topology view also reflects the update.

18. The computer program product according to claim 17, wherein the computer-readable program code is further configured for sounding an audible indicator when the boundary is crossed.

19. The computer program product according to claim 17, wherein the boundary is an outermost perimeter of the elements in the rendered first topology view.

20. The computer program product according to claim 17, wherein the computer-readable program code is further configured for establishing access control rights to each individual one of the selected elements in the first topology view by establishing a single access control right to a collection that represents the selected elements in the second topology view.

* * * * *